(12) United States Patent
Miller (10) Patent No.: US 10,473,495 B2
(45) Date of Patent: Nov. 12, 2019

(54) FLUID-METERING DEVICE

(71) Applicant: Flostem Limited, Horsham (GB)

(72) Inventor: Austen Miller, Andover (GB)

(73) Assignee: Flostem Limited, Horsham (GB)

( * ) Notice: Subject to any disclaimer, the term of this patent is extended or adjusted under 35 U.S.C. 154(b) by 0 days.

(21) Appl. No.: 15/579,517

(22) PCT Filed: Jun. 6, 2016

(86) PCT No.: PCT/GB2016/051664
§ 371 (c)(1),
(2) Date: Dec. 4, 2017

(87) PCT Pub. No.: WO2016/193763
PCT Pub. Date: Dec. 8, 2016

(65) Prior Publication Data
US 2018/0149500 A1 May 31, 2018

(30) Foreign Application Priority Data

Jun. 4, 2015 (GB) .................................. 1509719.9

(51) Int. Cl.
*G01F 1/06* (2006.01)
*G01F 15/00* (2006.01)

(52) U.S. Cl.
CPC .............. *G01F 1/06* (2013.01); *G01F 15/001* (2013.01); *G01F 15/005* (2013.01)

(58) Field of Classification Search
CPC ......... G01F 1/06; G01F 15/001; G01F 15/005
See application file for complete search history.

(56) References Cited

U.S. PATENT DOCUMENTS

| | | | |
|---|---|---|---|
| 3,097,762 | A | 7/1963 | Charnota et al. |
| 3,507,420 | A | 4/1970 | Nelson et al. |
| 3,810,562 | A | 5/1974 | Clarke |
| 4,202,467 | A | 5/1980 | Rutten et al. |

(Continued)

FOREIGN PATENT DOCUMENTS

| | | |
|---|---|---|
| CN | 20371248 | 8/2012 |
| DE | 1803288 | 5/1970 |

(Continued)

*Primary Examiner* — Nicholas J. Weiss
(74) *Attorney, Agent, or Firm* — Jason P. Mueller; Adams and Reese LLP (57) ABSTRACT

The present invention relates to a device for metering the flow of a fluid. A fluid-metering device for a hose or pipe, comprises: a body (10) having an inlet (12) and an outlet (11); an impeller (20) drivable by a flow of fluid through the device; a barrel (40), having an inlet (42) and an outlet (43), slidably mounted in the body (10) such that the barrel (40) is slidable between an open position wherein the barrel inlet (42) and outlet (43) are aligned with the body inlet (12) and outlet (11) such that a fluid can flow through the device and drive the impeller (20), and a closed position wherein the barrel inlet (42) and outlet (43) are offset from the body inlet (12) and outlet (11) such that a fluid cannot flow through the device, the barrel (40) being biased towards the closed position; and latching means (50) arranged to hold the barrel (40) in the open position, wherein a predetermined number of rotations of the impeller (20) will release the barrel (40).

3 Claims, 10 Drawing Sheets

(56) References Cited

U.S. PATENT DOCUMENTS 5,207,354 A * 5/1993 Hsu ..................... A01G 25/162
   137/119.07
5,878,955 A    3/1999 Al-Hamlan

FOREIGN PATENT DOCUMENTS

| EP | 0207301 | 5/1986 |
| EP | 1407660 | 4/2004 |
| GB | 2470766 | 8/2010 |
| WO | 2006/037351 | 4/2006 |

* cited by examiner

FLUID-METERING DEVICE

BACKGROUND OF THE INVENTION

The present invention relates to a device for metering the flow of a fluid.

Devices for supplying a certain amount of water are known. These systems typically achieve fluid-metering by comprising a stop valve connected to a device for measuring a finite period of time and ceasing the flow of fluid after this period of time. These devices are often based upon clockwork or electronic solutions, and are commonly used to meter the flow of water in situations such as garden watering or metered showering.

These known devices take no account of the actual flow of water through the pipe. The conventional timing devices do not take into account the intensity of the flow through the device, or allow for cessation of flow to not be counted. In times of increasing social responsibility, where the environmental as well as monetary cost of the use of natural resources is coming under ever increasing scrutiny it is advantageous to produce a fluid-metering device which does not have these drawbacks. By reacting to such information about the flow, the usage of the device can be more directly linked to the volume of fluid flow and hence the currency cost of the operation.

SUMMARY OF THE INVENTION

According to the present invention there is provided a fluid-metering device for a hose or pipe, comprising: a body having an inlet and an outlet; an impeller drivable by a flow of fluid through the device; a barrel, having an inlet and an outlet, slidably mounted in the body such that the barrel is slidable between an open position wherein the barrel inlet and outlet are aligned with the body inlet and outlet such that a fluid can flow through the device and drive the impeller, and a closed position wherein the barrel inlet and outlet are offset from the body inlet and outlet such that a fluid cannot flow through the device, the barrel being biased towards the closed position; and latching means arranged to hold the barrel in the open position, wherein a predetermined number of rotations of the impeller will release the barrel. The rotation of the impeller is more linearly related to the volume flow of water through the device. As such when there is no fluid flow; the device will not continue to count this time as usage. Indeed, longer usage can be achieved by reducing the flow rate of fluid through the device. This allows the cost of the fluid being used to be more directly linked to operation of the device. The barrel design reduces the number of required moving parts; and allows for one motion to start the flow of fluid and the metering.

The body inlet and outlet may be substantially aligned in a first axis; and the barrel is slidable along a second axis which is substantially perpendicular to the first axis. This allows the device to be mounted in-line in a hose or pipe more easily; especially one mounted on a wall such as a metered shower.

The device may further comprise a spring to bias the barrel towards the closed position. By biasing the barrel towards the closed position the risk of accidental leaks of the device is reduced.

The device may further comprise a depressible member for moving the barrel from the closed position to the open position. This allows for the device to be easily and quickly moved between the open and closed positions The latching means may further comprise at least one biasing member for biasing the latching means towards a first position for holding the barrel in the open position and wherein rotation of the impeller acts to move the latching means against the at least one biasing member. This ensures that when the barrel is depressed the latching means is quick to hold the device in the open position, while accidental movement of the latching means is minimised by providing a biasing force against rotation which tends to close the device.

The latching means may further comprise a rotatable member comprising flanges for engaging with the barrel to hold the barrel in an open position wherein a fluid can flow through the device, wherein a predetermined number of rotations of the impeller will cause the flanges to disengage with the barrel.

The impeller may comprise a body from which extend a plurality of blades, wherein the blades extend inwardly from the outer periphery of the impeller and extend over a distance of between 23% and 43% the radius of the impeller (the radius being the distance from the centre of the impeller to the outermost extents of the blades). This reduces the manufacturing costs, as well as achieving greater efficiency by optimising the flow of the fluid through the device. Preferably, the impeller blades are circumferentially spaced apart.

Optionally, the trailing edge of each blade terminates at an angle of between 25 and 40 degrees to the tangent of the circular arc that follows as the impeller rotates.

The body may further comprise an inner chamber housing the impeller; wherein the inner chamber is in fluid communication with the inlet and outlet ports via at least one subsidiary port for each of the inlet and outlet, wherein the subsidiary points are offset from a third axis defined by the centreline of the impeller wherein one port is offset in a first direction and the other port is offset in a second direction which is opposed to the first direction. Offsetting the subsidiary ports in this manner increases the efficiency of the device by optimising the fluid flow path, and also allows the device to operate in a bi-directional manner. The first and third axes may be coincident; this produces a device which is more suitable for mounting in line with a pipe or hose.

The device may further comprise epicyclic gearing to transmit movement between the impeller and the latching means. Such gearing allows for a very large gear ratio to be achieved in a relatively small space. Thus the device is not particularly large and the impeller can rotate at high speeds.

The planetary gears may be unconstrained in this gearbox, without a carrier as is traditional in epicyclic gearboxes.

The epicyclic gearing may have a plurality of stages forming a multi-stage gearbox, each stage having a sun gear and a plurality of planetary gears. Again by separating the gearbox into stages the gear ratio can be increased while space is saved. This further results in a smaller final device and an impeller which is able to rotate at high speeds.

The device may further comprise a non-slip clutch for selectively engaging the latching means with the impeller, movable between an engaged position wherein movement of the impeller drives movement of the latching means and a disengaged position. The non-slip clutch may be a dog clutch. The non-slip clutch may be moved between the engaged and disengaged position by the movement of the barrel.

According to a further embodiment of the present invention, there is also provided a fluid-metering device for a hose or pipe, comprising: a body having an inlet and an outlet; flow restriction apparatus for selectively allowing or restricting the flow of fluid through the body, biased from an open position wherein a fluid can flow through the device towards a closed position wherein a fluid cannot flow through the device; latching means comprising: a rotatable member comprising flanges for engaging with the flow restricting apparatus to hold the flow restricting apparatus in the open position, driven by a flow of fluid through the device to disengage with the flow restriction device. The engagement or not of the latching means is more linearly related to the volume flow of water through the device than in prior art systems. As such when there is no fluid flow; the device will not continue to count this time as usage. Indeed, longer usage can be achieved by reducing the flow rate of fluid through the device. This allows the cost of the fluid being used to be more directly linked to operation of the device.

According to a third embodiment of the invention, there is provided a fluid-metering device for a hose or pipe, comprising: a body having an inlet and an outlet; an impeller drivable by a flow of fluid through the device; flow restriction apparatus for selectively allowing or restricting the flow of fluid through the body, biased from an open position wherein a fluid can flow through the device towards a closed position wherein a fluid cannot flow through the device; latching means for holding the flow restricting apparatus in the open position, wherein a predetermined number of rotations of the impeller will cause the latching means to release the flow restriction device; gearing for transmitting motion from the impeller to the latching means; and a non-slip clutch for selectively engaging the latching means with the impeller, movable between an engaged position wherein movement of the impeller drives movement of the latching means and a disengaged position. By engaging and disengaging the non-slip clutch with the rotation of the impeller and the latching means the device can be reset to a starting position for metering a certain amount of water. Since the impeller is drivable by the flow of fluid through the device the volume flow of fluid is more linearly related to the allowed flow. As such when there is no fluid flow; the device will not continue to count this time as usage. Indeed, longer usage can be achieved by reducing the flow rate of fluid through the device. This allows the cost of the fluid being used to be more directly linked to operation of the device.

BRIEF DESCRIPTION OF THE DRAWINGS

The invention will now be described in detail, by way of example only, with reference to the accompanying figures in which.

DETAILED DESCRIPTION

Figure 1:
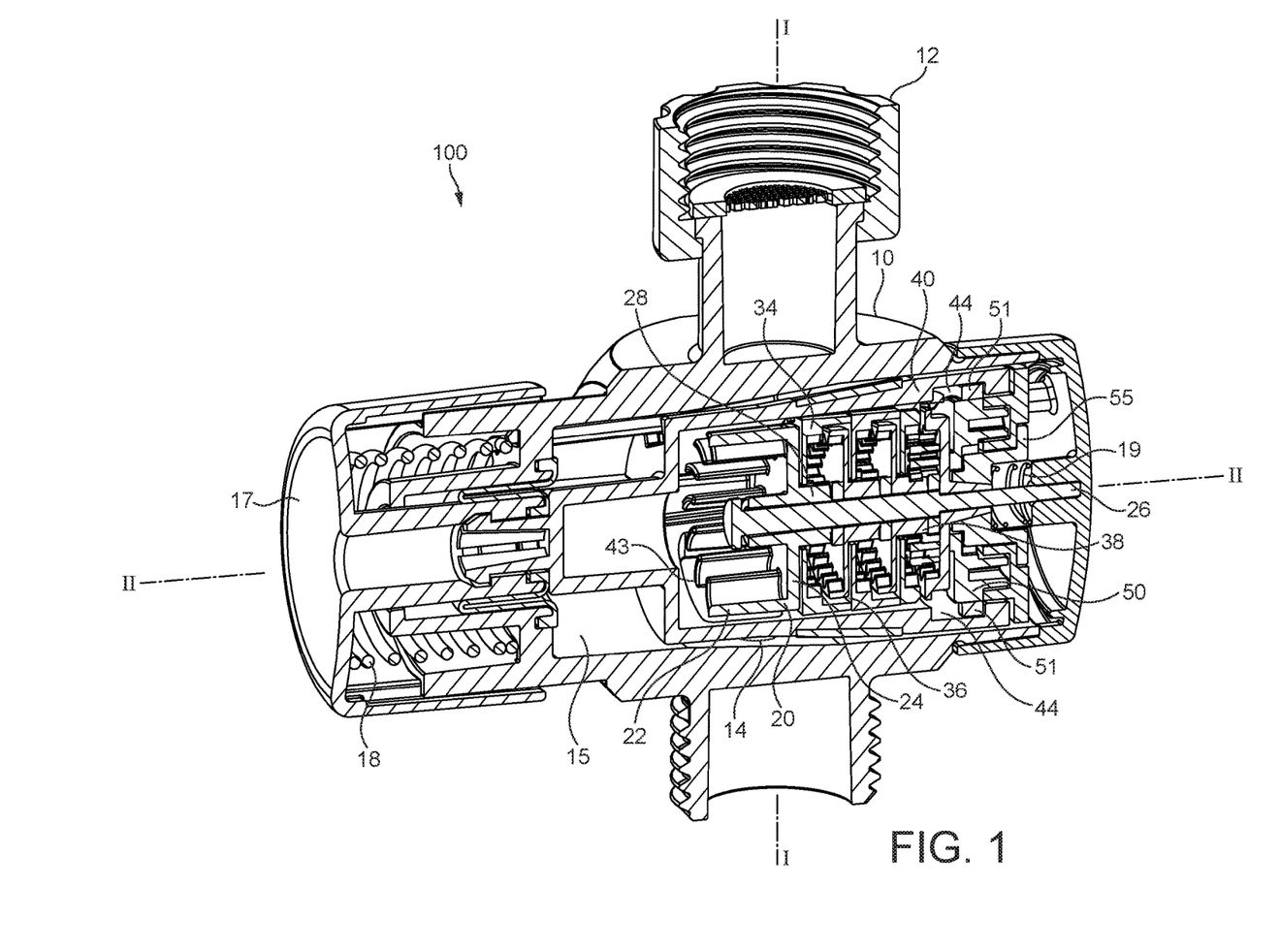
FIG. 1 is a cross-sectional view of the fluid-metering device.

With reference to FIG. 1, there is shown a fluid-metering device 100 for a hose or pipe. The device comprises a body portion 10 with interchangeable inlet and outlet ports 12, 11. The device 100 could, in alternative embodiments, be formed integrally with pipes extending outwardly in place of ports 11, 12. Each of the inlet and outlet ports is in fluid communication with an inner chamber 15 via subsidiary ports 13, 14. Housed in the inner chamber 15 is a barrel 40, which is slidable in the inner chamber 15 along an axis II between an open position (shown in FIGS. 1 and 4B), and a closed position (shown in FIG. 4A). Attached to the barrel 40 is a depressible member 17, such as a button, which is biased by first biasing member 18. The first biasing member 18 biases the barrel 40 towards the closed position FIG. 4A. The barrel 40 is provided with two cut-out segments 42, 43 which align with the subsidiary ports 13, 14 in the open position of FIG. 1 to allow a fluid to flow through the device. In the closed position of FIG. 4A, the barrel 40 blocks the subsidiary ports 13, 14 and does not allow a fluid to flow through the device. In this case, the two cut-out segments 42, 43 do not align with subsidiary ports 13, 14.

Latching member 50 is selectively engageable with the barrel 40. Preferably, the latching member 50 is rotatable about axis 11. The latching member 50 has flanges 51 which engage with slots 44 in the barrel when the flanges 51 are in certain positions defined by the rotation of the latching member 50. When these flanges 51 are engaged with the barrel 40, the barrel 40 is held in the open position of FIG. 1. When the flanges 51 are not engaged with slots 44, the barrel 40 is free to slide along axis II under the action of the first biasing member 18.

One or more second biasing members 54A, 54B are mounted in a retaining member 37, and act to rotatably bias the rotatable latching member 50 towards a rotation in which the flanges 51 are engaged with the barrel slots 44.

Figure 3A:
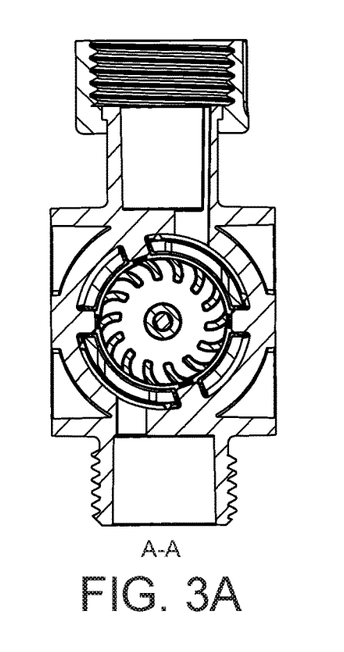
FIG. 3A is a side view of the device.
Figure 3B:
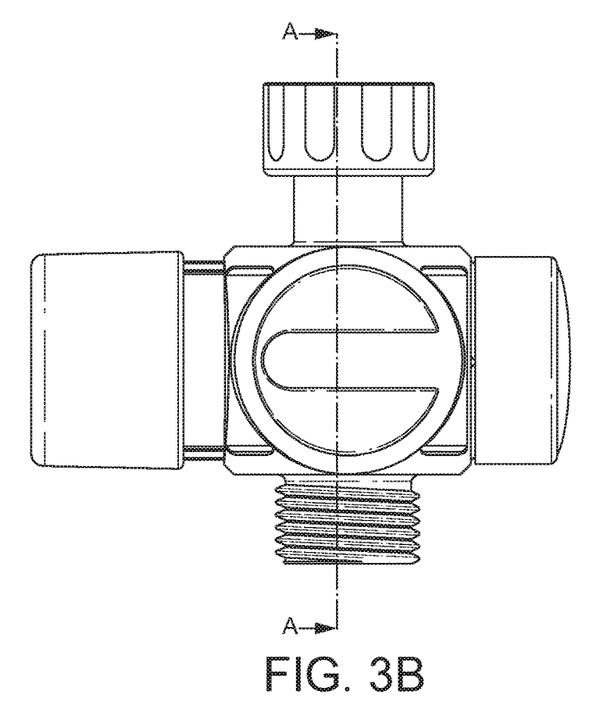
FIG. 3B is a cross-sectional view along the line A-A.

An impeller 20 is mounted within the barrel 40 on a shaft 26 such that it can be driven by flow of a fluid through the device. The shaft 26 may be aligned with axis II. The impeller 20 preferably comprises a body 24 from which extend a plurality of blades 22 in the direction of axis II. The blades 22 extend towards the axis of rotation of the impeller body 24. Preferably, a gap is provided between the blades 22 such that they do not meet on the axis of rotation. For example, the blades 22 extend from the outer periphery of the body 24 for less than 45% of the radius of the impeller. As shown in FIG. 3B, the subsidiary ports 13, 14 are offset from the axis 11, about which the impeller 20 rotates, in opposing directions. This can provide greater efficiency and can allow the device to operate bidirectionally.

Figure 3C:
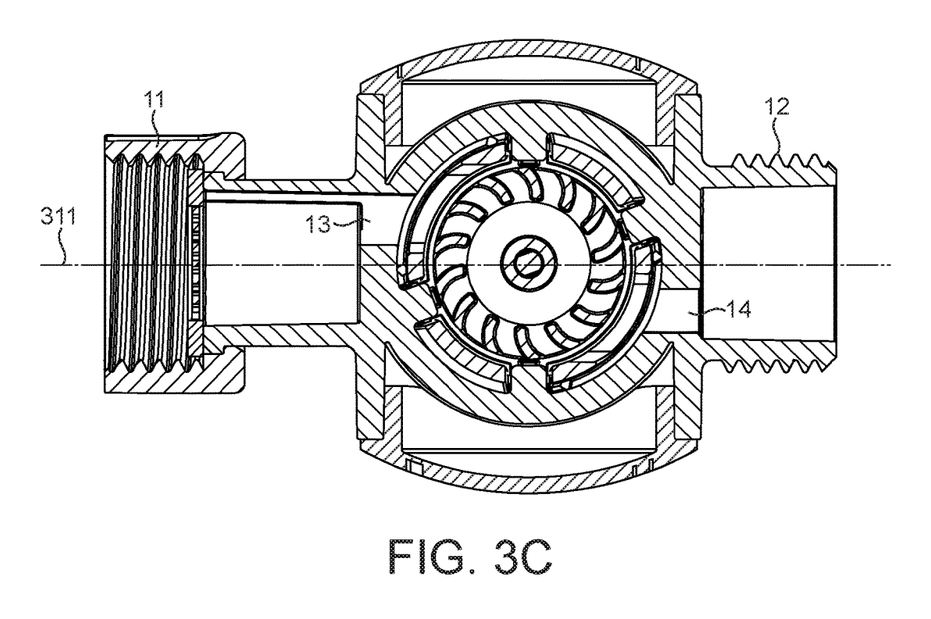
FIG. 3C is a preferred variant of the device showing relative dimensions.

FIG. 3C shows, in an equivalent view of that of FIG. 3B, a preferred variant of the device. As in FIG. 3B, the subsidiary ports 13, 14 are offset in opposing directions from a line 311 passing through the axis 11 about which the impeller 20 rotates, and the centre of the inlet and outlet ports 11, 12.

The subsidiary ports 13, 14 have a width A. They are preferably circular in cross-section, with a diameter A.

The trailing edges of the impeller blades 22 (the radially outermost extents of the blades 22) travel along a path defining a first circle centred on axis 11.

The diameter of the first circle D1 is from 360% A to 380% A (i.e., bigger than A by a factor from 3.6 to 3.8).

The impeller blades 2 are spaced circumferentially around the impeller 20, and are spaced apart by a distance of 50% A to 70% of A.

The impeller blades only extend radially inwardly from the edge by a distance in the range 11.5% D1 to 21.5% D1. In other words, the leading edges of the impeller blades 22 (the radially innermost extents of the blades 22) travel along a path defining a second circle centred on axis 11. The second circle defines a circular space having a diameter D2. D2 is from 57% D1 to 77% D1.

Figure 2:
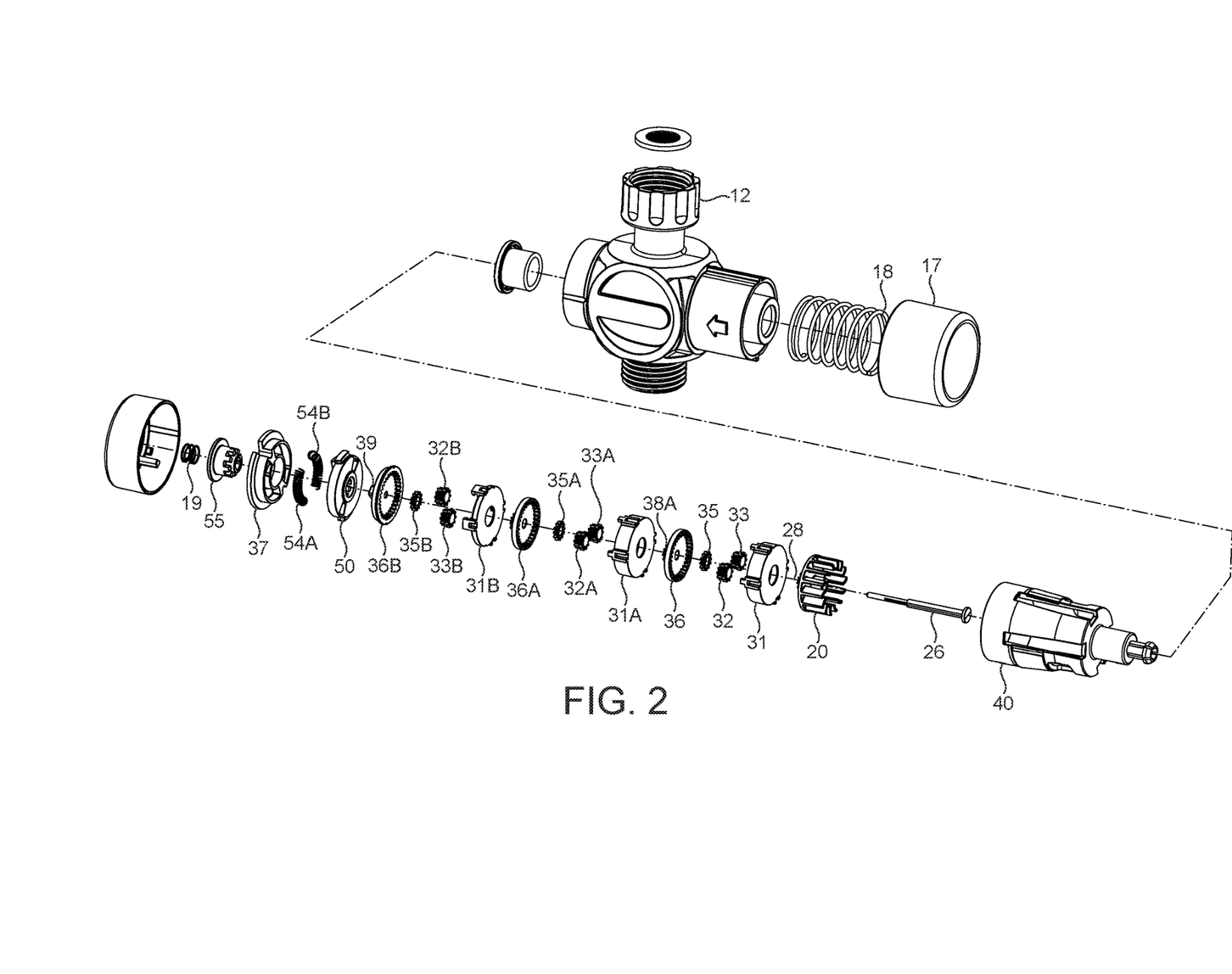
FIG. 2 is an exploded view of the fluid-metering device.

In all variants, the impeller 20 may be provided with a gear 28 for driving the rotation of the rotatable latching member 50, for example via a gearbox. Alternatively, the impeller 20 may have an engaging member 39 in place of the gear 28 as discussed below. The gearbox is preferably an epicyclic gear box. Most preferably the gearbox has a plurality of stages of epicyclic gears. The gear 28 may form a sun gear of a first epicyclic gear stage. Each epicyclic gear stage may comprise: compound planetary gears 32, 33 which comprise two sections with differing gear teeth; a first section for engaging with a first sun gear 28 and a first annular gear 34; and a second section for engaging with a second sun gear 35 and a second annular gear 36. The first annular gear 34 and the second sun gear 35 are rotationally fixed. The second annular gear 36 may be attached to a first sun gear 38A of a next stage of the epicyclic gearbox.

This first sun gear 38A is engaged with two further compound planetary gears 32A, 33B and a further first annular gear 34A. Again the two compound planetary gears may comprise two sections with differing gear teeth; a first section for engaging with the first sun gear 38A and the first annular gear 34A, and a second section for engaging with a second sun gear 35A and the second annular gear 36A. The first annular gear 34A and the second sun gear 35A are rotationally fixed. The second annular gear 36A may be attached to a further first sun gear 38B if a further stage is provided.

In this manner a multi-stage gearbox is formed for transmission of the rotation of the impeller 20 to the rotatable latching member 50. The first annular gears 34 are preferably located on the inner surface of gearbox stage housing members 31, 31A, 31B which may clip together to form the casing for the multi-stage gearbox. While the embodiment shown in the figures has 3 stages, any suitable number of gearbox stages may be used.

Irrespective of the number of stages, the final gearbox stage (denoted by the suffix B in FIG. 2) comprises the same gear components as the other stages. However, an engagement member 39 is attached to the second annular gear 36B rather than a further sun gear. This engagement member 39 is of any form suitable for engaging with the latching member 50.

The impeller 20 or the output of the gearbox is engaged with the latching member 50 by the engaging member 39 via a dog clutch 55. While a dog clutch is used in the present embodiment, any suitable non-slip clutch may be used. A third biasing member 19 biases the dog clutch into engagement with the gearing and the latching member 50. Rotation of the impeller 20 can be transmitted to the latching member 50 when the dog clutch 55 is engaged with the engaging member 39 such that flow of fluid through the device can cause the latching member 50 to rotate towards a position in which the flanges 51 are disengaged from the barrel slots 44 against the biasing of the second biasing members 54A, 54B.

Operation of the device will now be described with reference to FIGS. 4A to 4F.

Figure 4A:
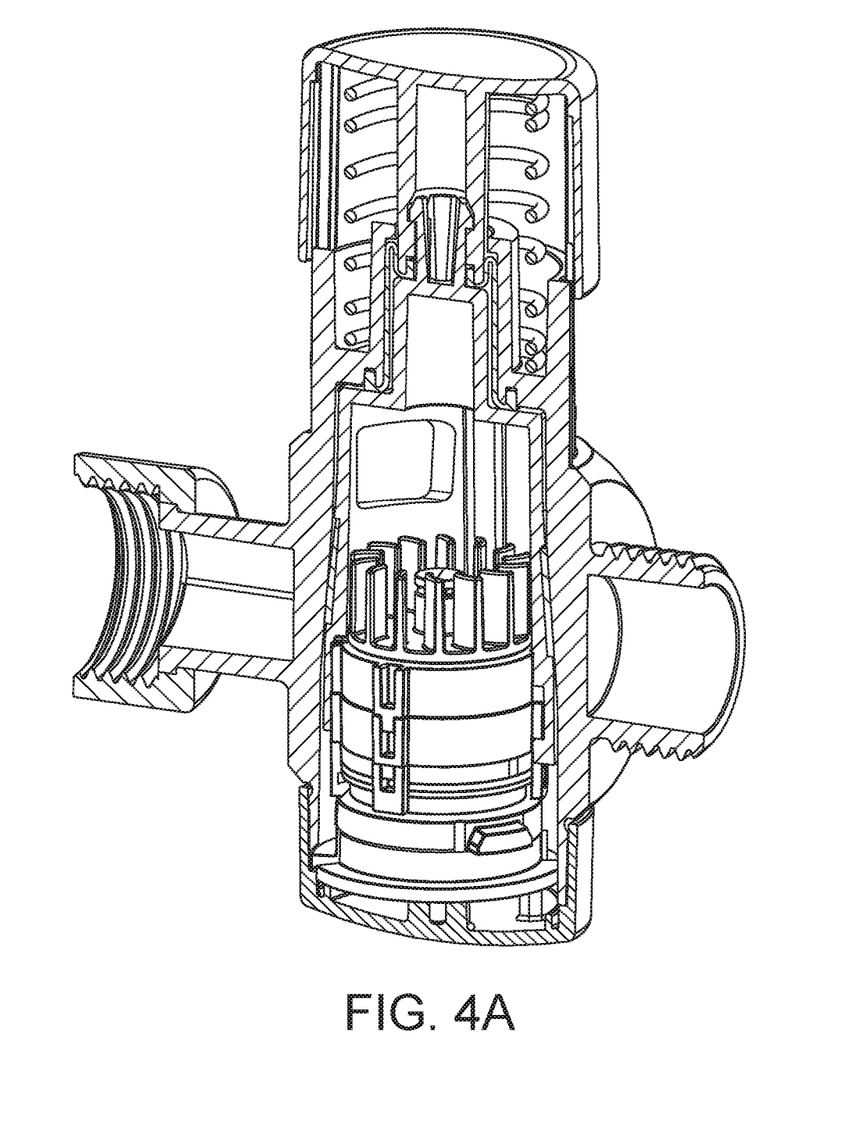
FIGS. 4A to 4F are a series of drawings showing operation of the device.
Figure 4B:
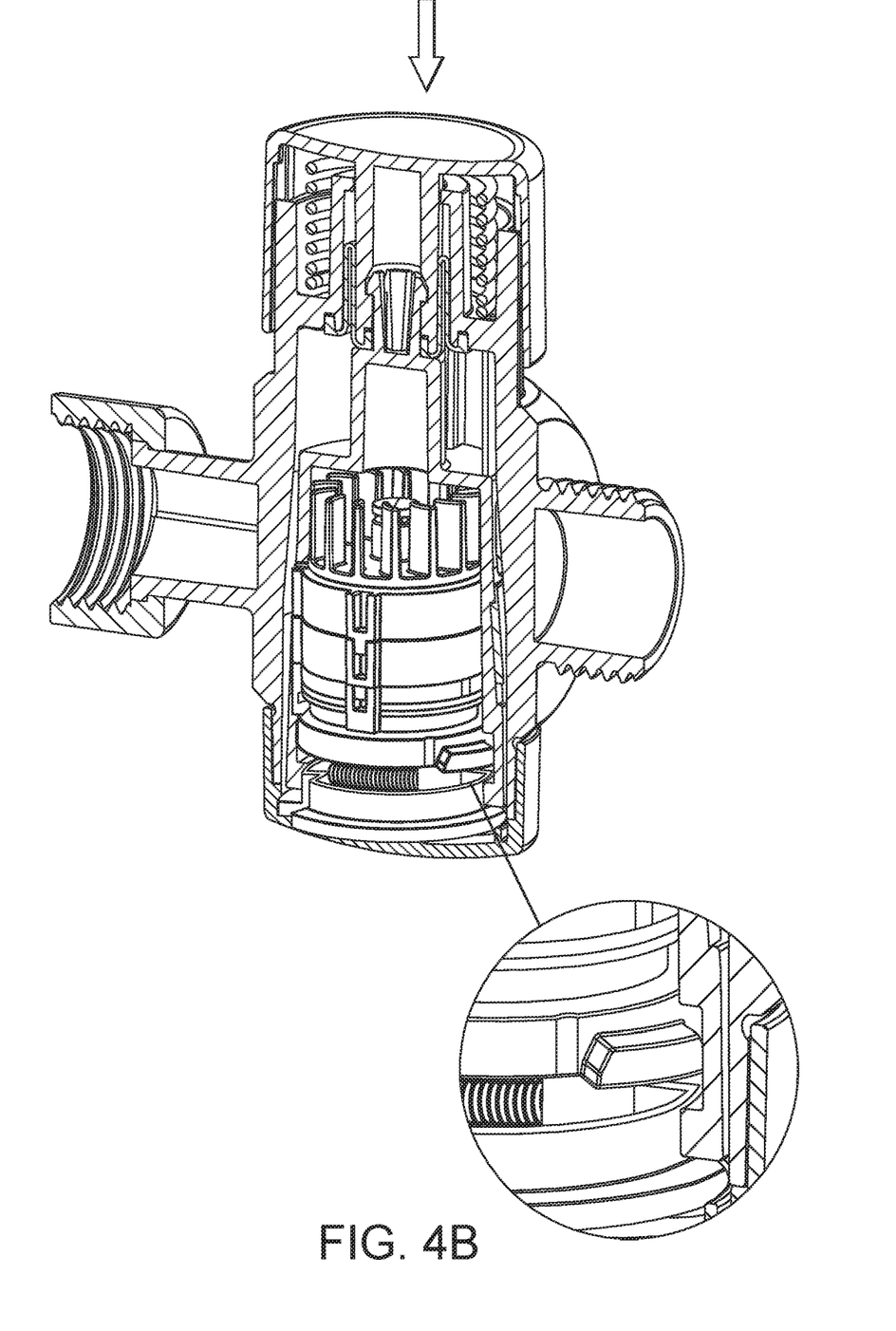
Figure 4C:
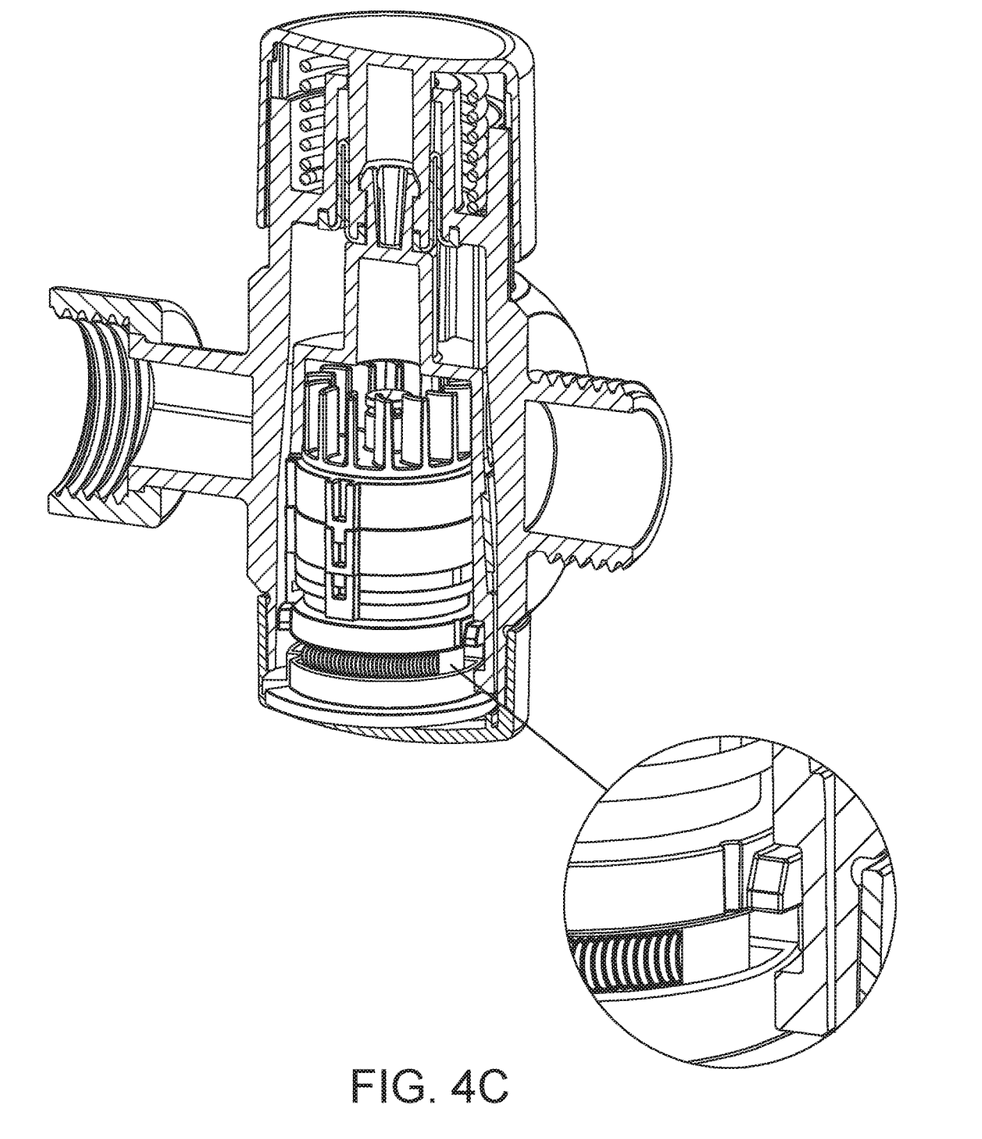
Figure 4D:
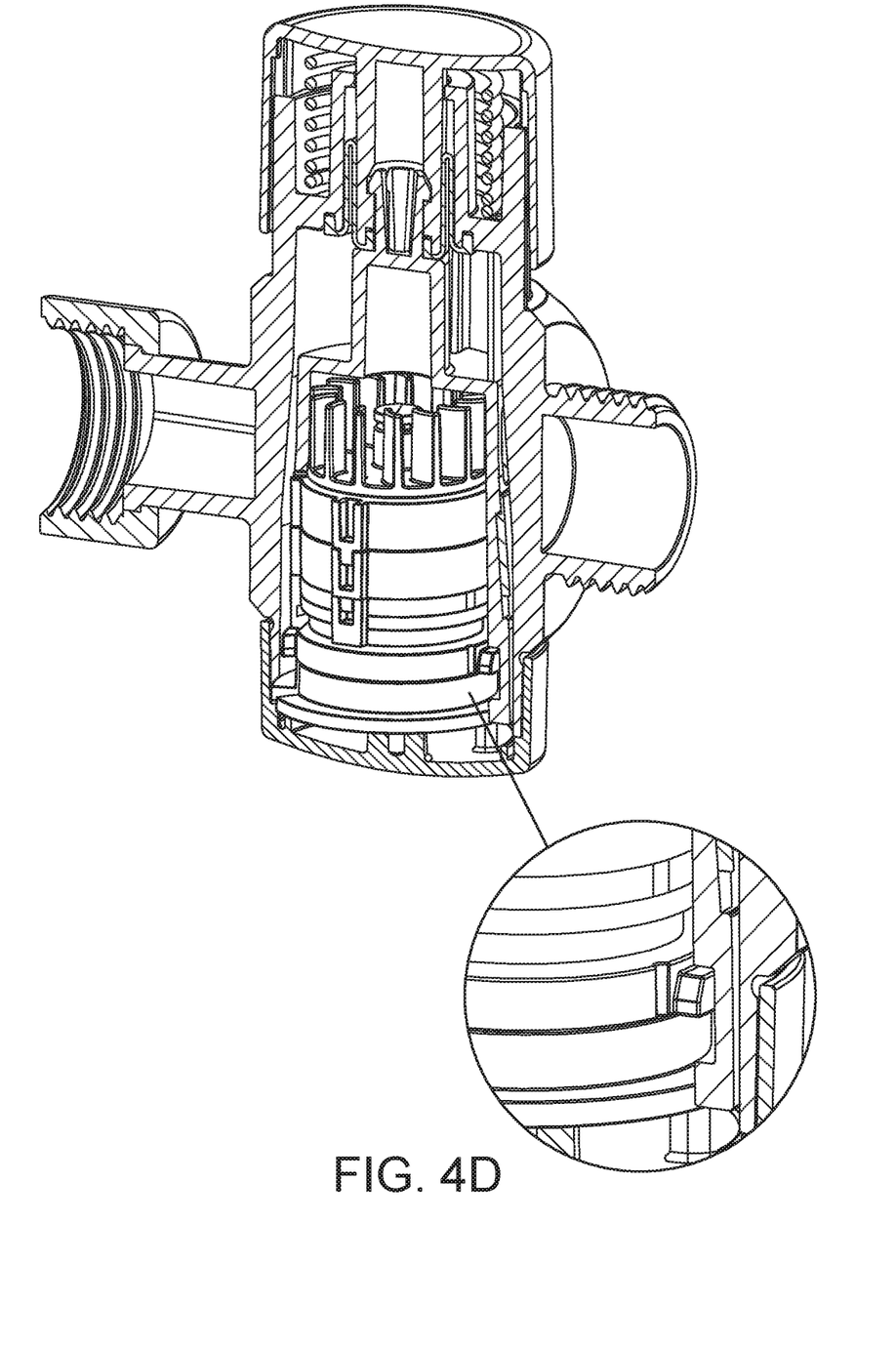

FIG. 4A shows the fluid-metering device in the closed position; the barrel 40 is in the uppermost section of the inner chamber 15 and the cut out segments 42, 43 are not aligned with the subsidiary ports 13, 14. Thus no water can flow through the device. In FIG. 4B the depressible member 17 is depressed against the biasing of the first biasing member 18. The cut out segments 42, 43 are now substantially aligned with the subsidiary ports 13, 14 and water is able to flow through the device. The distal end of the barrel comes into contact with the retaining member 37 which in turn pushes the dog clutch 55 away from the latching member 50 such that the dog clutch 55 is disengaged from the latching member 50. With the dog clutch 55 disengaged fluid flowing through the device will not drive the latching member 50 and so the second biasing members 54A, 54B can rotate the latching member 50 to the position shown in FIG. 4C wherein the flanges 51 of the latching member 50 are able to engage with the barrel 40 as shown in FIG. 4D.

The engagement of the flanges 51 and the barrel 40 acts to hold the barrel in the open position. However, it is preferable that the flanges 51 are thinner (in the direction of axis II) than the slots 44 in the barrel 40 so that some axial motion is possible. When the barrel 40 is released, the first biasing member 18 acts on the barrel 40 to move it slightly (i.e. the amount permitted by the greater axial dimension of the slots 44 than the flanges 51) towards the starting position, such that the retaining member 37 is also able to move slightly towards the starting position under the action of the third biasing member 19, and the dog clutch 55 is engaged with the latching member 50. This permits transmission of rotation of the impeller 20 to the latching member 50 when the barrel 40 has been released by the user and is held in the open position by the retaining member 37.

Figure 4E:
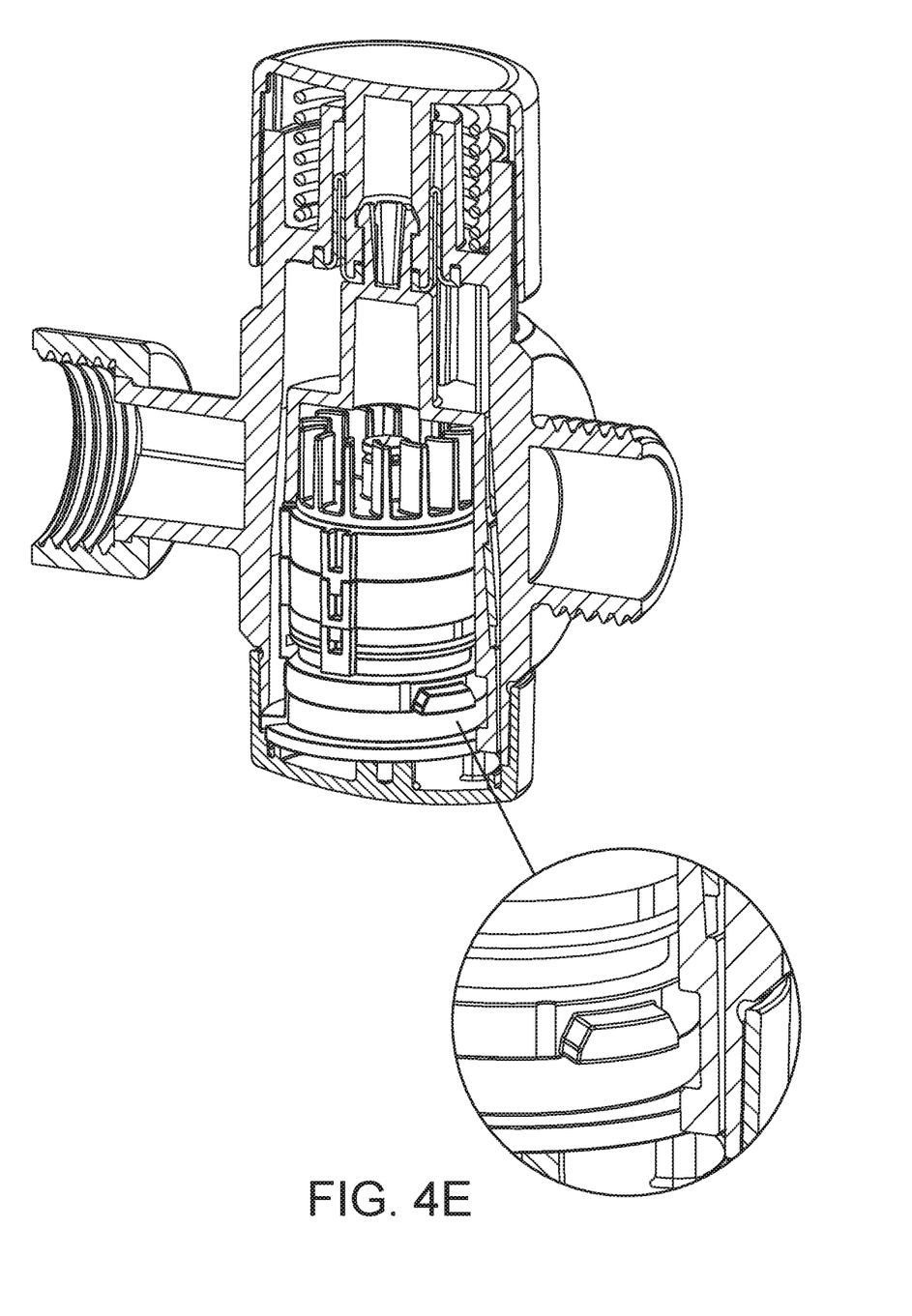
Figure 4F:
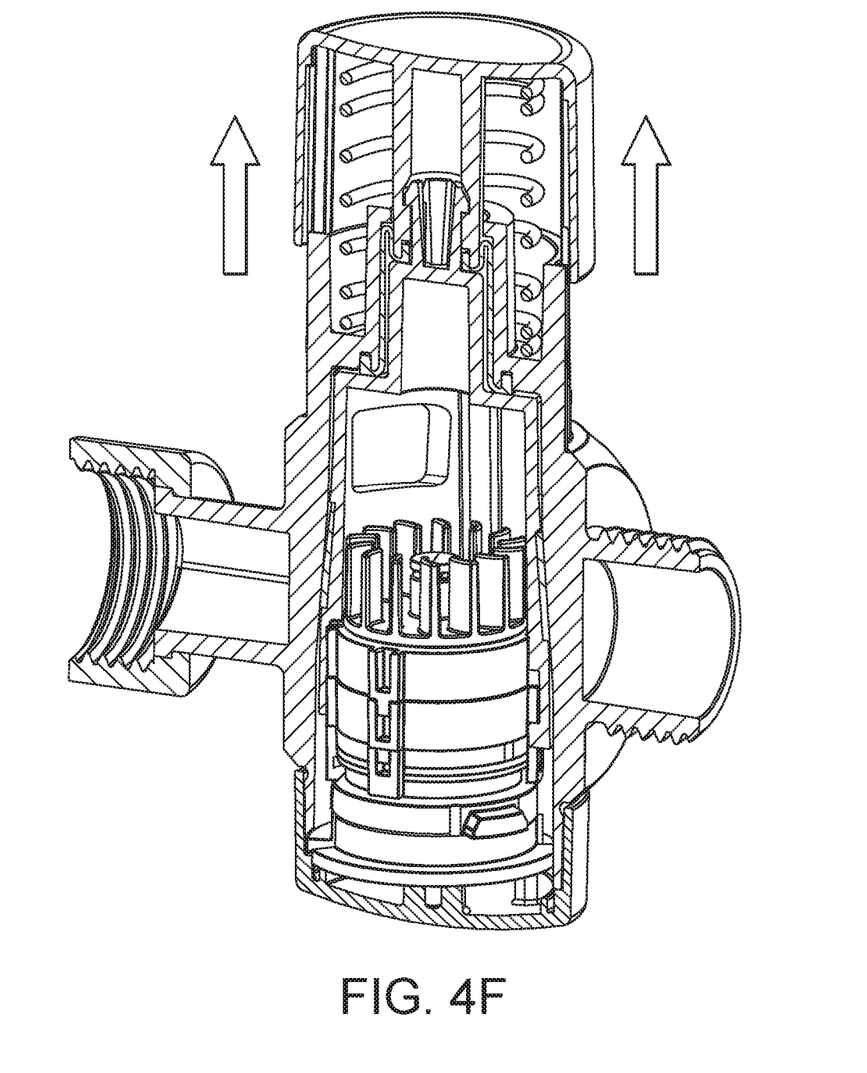

As a fluid flows through the device, the impeller 20 is turned, thereby driving the epicyclic gearbox and in turn the latching member 50 via the dog clutch 55. The fluid flow can be sufficient to overcome the biasing force of the one or more second biasing members 54A, 54B. This can rotate the latching member 50 until the flanges 51 are no longer engaged with the barrel, as shown in FIG. 4E. The first biasing member 18 can then move the barrel 40 back towards the closed position as shown in FIG. 4F, wherein the cut out segments 42, 43 are no longer aligned with the subsidiary ports 13, 14. In this manner the flow of fluid through the barrel is ceased, following a predetermined number of rotations of the impeller.

The invention claimed is:

1. A fluid-metering device for a hose or pipe, comprising:
   a body having an inlet and an outlet;
   a flow restriction apparatus for selectively allowing or restricting the flow of fluid through the body, biased from an open position wherein a fluid can flow through the device towards a closed position wherein a fluid cannot flow through the device; and
   a latching means,
      wherein the latching means includes a rotatable member comprising flanges for engaging with the flow restricting apparatus to hold the flow restricting apparatus in the open position, driven by a flow of fluid through the device to release the flow restriction apparatus to return it to the closed position, and
      wherein the flanges extend radially outwardly from the rotatable member.

2. The fluid-metering device of claim 1, wherein the latching means further includes at least one biasing member for biasing the latching means towards a first position for holding the flow restriction apparatus in the open position, and wherein flow of fluid through the device acts to move the latching means against the at least one biasing member.

3. The fluid-metering device of claim 1, further comprising an impeller drivable by a flow of fluid through the device; wherein a predetermined number of rotations of the impeller will cause the flanges to disengage with the flow restriction device.

* * * * *